United States Patent [19]

Moss

[11] 4,121,703
[45] Oct. 24, 1978

[54] AUTOMATIC SLACK ADJUSTERS FOR VEHICLE BRAKE LINKAGES

[75] Inventor: Norman Sydney Moss, West Midlands, England

[73] Assignee: Girling Limited, Birmingham, England

[21] Appl. No.: 814,733

[22] Filed: Jul. 11, 1977

[30] Foreign Application Priority Data

Jul. 13, 1976 [GB] United Kingdom ............. 29040/76

[51] Int. Cl.² ............................................. F16D 65/56
[52] U.S. Cl. ......................... 188/196 BA; 188/79.5 K
[58] Field of Search ........ 188/79.5 K, 196 P, 196 BA

[56] References Cited

U.S. PATENT DOCUMENTS

| 3,662,865 | 5/1972 | Newstead et al. | 188/79.5 K X |
| 3,724,607 | 4/1973 | Reinecke | 188/79.5 K |
| 3,997,036 | 12/1976 | Zeidler | 188/79.5 K |

*Primary Examiner*—Duane A. Reger
*Attorney, Agent, or Firm*—Scrivener, Parker, Scrivener & Clarke

[57] ABSTRACT

An automatic slack adjuster for a vehicle brake linkage comprising a housing constituting a lever in the linkage, and the lever is angularly movable about the axis of a shaft to impart to the shaft a brake-applying rotary movement which it transmits to it through a meshing worm and worm wheel assembly. Automatic worm driving means are incorporated for rotating the worm for adjustment of slack in the linkage in response to relative movement between the lever and a relatively stationary part, and the worm driving means incorporates a connection having a degree of lost-motion equivalent to a desired braking clearance, and a spring-loaded two-part clutch disposed between the worm and a slidable pawl connected to the stationary part.

4 Claims, 5 Drawing Figures

AUTOMATIC SLACK ADJUSTERS FOR VEHICLE BRAKE LINKAGES

SPECIFIC DESCRIPTION

This invention relates to an automatic slack adjuster for a vehicle brake linkage, the adjuster being of the kind comprising a housing which constitutes a lever in the linkage and is mounted for rocking movement about the axis of the shaft which is adapted to be partially rotated about an axis for applying or releasing a brake, and force is adapted to be transmitted between the housing and the shaft by means of a worm mounted in the housing and meshing with a worm wheel mounted on and secured against rotation relative to the shaft, the arrangement being such that adjustment of slack in the linkage is effected by rotation of the worm to alter the angular position of the worm wheel with respect to the housing, automatic worm driving means being incorporated for rotating the worm for adjustment of the slack in the linkage in response to relative movement between the lever and a relatively stationary part.

In some known automatic slack adjusters of the kind set forth the worm drive means includes a one-way clutch and the worm is displaced axially against an energy-storing return spring to disengage the clutch when relative movement between the lever and the stationary part has exceeded a predetermined value and, on release of the brake, the clutch is re-engaged by the release of energy in the spring which is operative to rotate the worm as the worm is returned axially to its initial position.

According to our invention in an automatic slack adjuster of the kind set forth for a vehicle brake linkage the automatic worm driving means incorporates a connection having a degree of lost-motion equivalent to a desired braking clearance and which includes a clutch comprising first clutch means coupled to the worm, second clutch means, and resilient means for urging the second clutch means normally into driving engagement with the first, and a slidable pawl acting between the second clutch means and the stationary part to effect rotation of the second clutch means after relative movement between the lever and the stationary part has exceeded a value equivalent to said degree of lost-motion.

Rotation of the second clutch means is transmitted through the first clutch means to cause corresponding rotation of the worm and the worm wheel until the frictional force of an engagement between the braking surfaces exceeds the force of engagement between the clutch means whereafter the clutch slips to prevent further rotation of the worm with respect to the housing.

Rotation of the worm to compensate for wear of the braking surfaces occurs during brake applying movements, while the braking clearance is being taken up. Thus, such adjustment is independent of thermal or other deflections which may occur in any part of the brake or brake applying mechanism incorporating the slack adjuster.

Preferably the connection having lost-motion is located between the pawl and the second clutch means so that rotation of the second clutch means occurs only upon direct engagement of the pawl with the second clutch means, and a one-way drive is disposed between the first clutch means and a spindle with which the worm is fast, a return spring provided for urging the pawl into an inoperative position deflecting to store energy therein as the pawl is moved linearly on each angular movement of the lever, release of the stored energy in a brake application after the lost-motion has been taken up and which is operative to return the pawl to the inoperative position also being operative to effect rotation of both clutch means with respect to the spindle and through the one-way drive, thereby re-establishing the desired degree of lost-motion.

Conveniently the second clutch means is provided with at least one tooth which is received in a notch in the pawl and the notch is of greater length than the circumferential length of the tooth to define the lost motion.

The clutch may be of the cone type comprising single first and second interengaging clutch members.

Conveniently the pawl is positively urged linearly by means of an engagement with an adjusting shaft which is eccentrically mounted with respect to the axis of rotation of the lever and is angularly through an arc of a circle centred on the stationary part with respect to which the lever is angularly movable.

The adjusting shaft itself rotates within the lever in response to movement of the lever and an arm of the adjusting shaft which locates in a stationary bracket.

One embodiment of our invention is illustrated in the accompanying drawings in which.

Figures 1, 3:
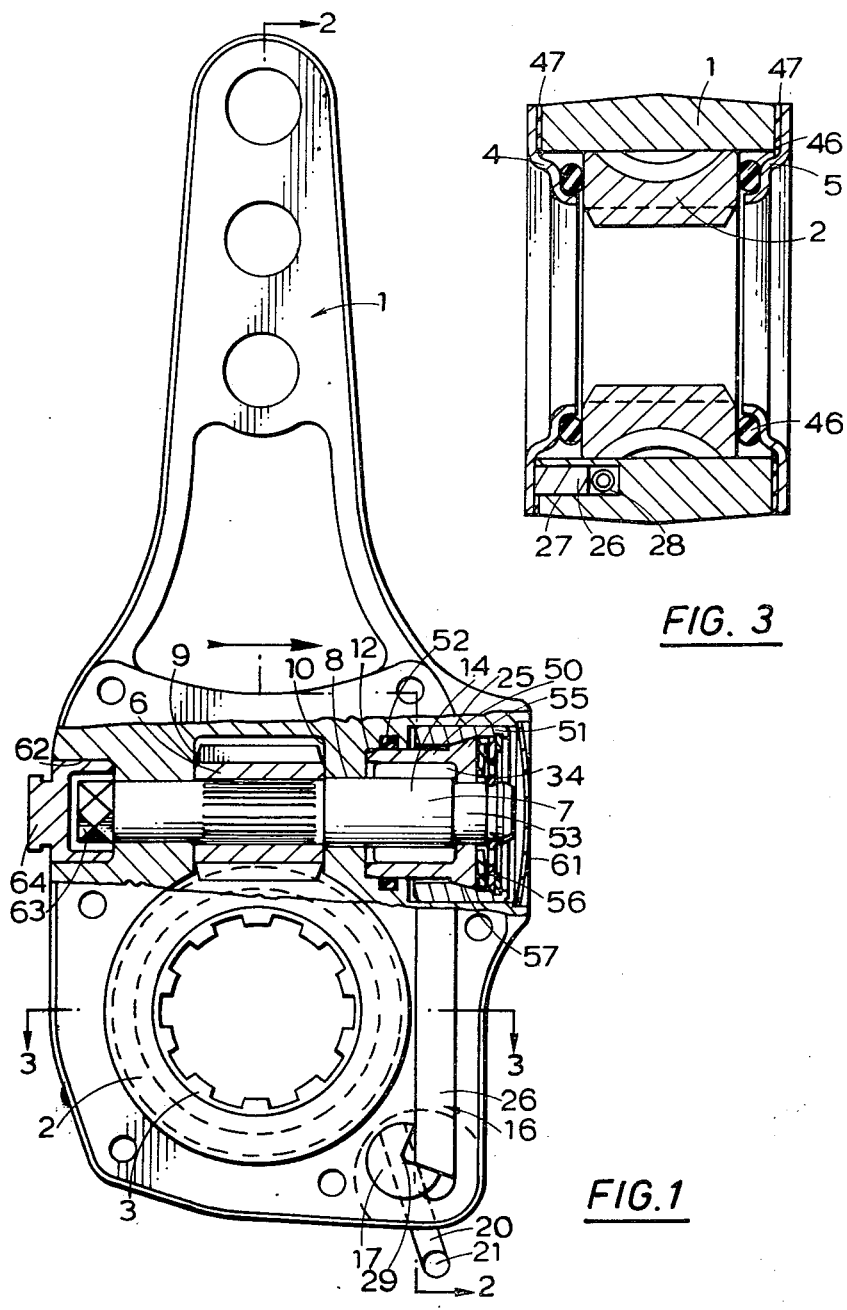
FIG. 1 is a side elevation of an automatic slack adjuster for a vehicle brake linkage with a side cover plate removed and including a section substantially on the line 1—1 of FIG. 2.
FIG. 3 is a section on the line 3—3 of FIG. 1.
Figure 2:
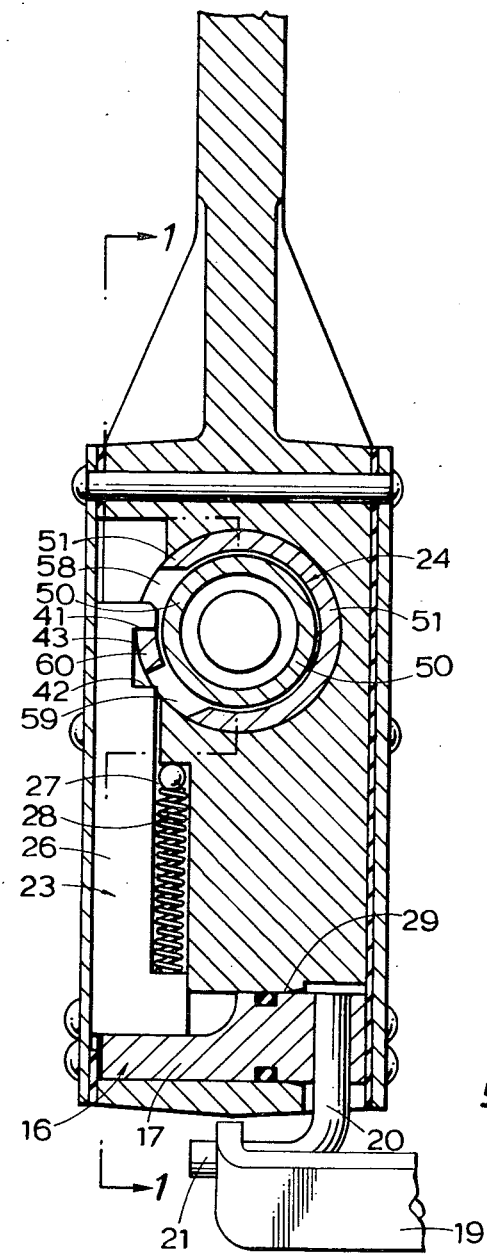
FIG. 2 is a section on the line 2—2 of FIG. 1.
Figure 4:
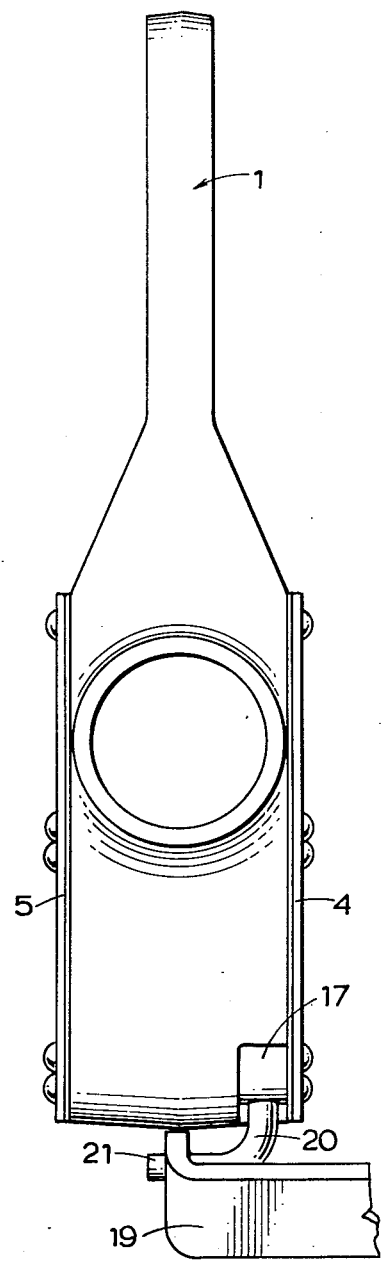
FIG. 4 is a view of one end of the adjuster.
Figure 5:
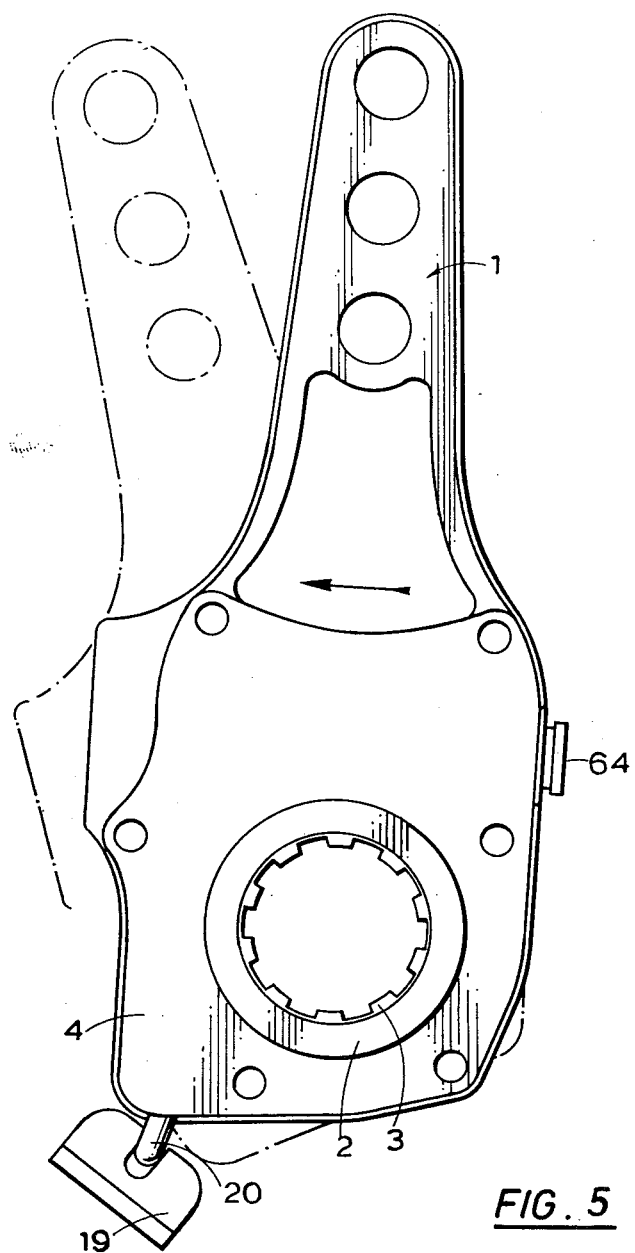
FIG. 5 is a side elevation of the opposite end of the adjuster.

The automatic slack adjuster illustrated in the accompanying drawings comprises a housing 1 constituted by a lever of a brake linkage which is adapted to be mounted for rocking movement with respect to the axis of a splined brake-applying shaft (not shown) and which has a free upper end for connection to a brake actuator through any one of three spaced eyes. The lever 1 acts on the shaft through a worm wheel 2 which is splined at 3 to the shaft and which is journalled for rotation in the housing 1 between spaced end closure plates 4 and 5 clamped against opposite sides of the housing.

The shaft is conveniently provided with at least one cam expander for applying friction members, for example shoes, to a rotatable braking member, for example a drum.

A worm 6 engaging with the worm wheel 2 is fast with a spindle 7 which is journalled for rotation in a bore 8 in the housing 1. The bore 8 is tangential to the axis of the brake-applying shaft and is enlarged at an intermediate point in its length to define spaced walls 9 and 10 between which opposite ends of the worm 6 are located in close proximity therewith.

One end of the bore is counterbored at 12 into which an end portion 14 of the spindle 7 projects. The opposite end portion 63 of the spindle is of square or or other non-circular outline and projects into a counterbore at the other end of the housing 1 which is closed by a closure cap 64. The end portion 63 can receive a key by means of which the spindle and the worm 6 can be rotated.

The housing incorporates automatic worm driving means 16 to rotate the worm 6 and the worm wheel 2 in order to compensate for wear of the linings of the friction members and thereby maintain a predetermined desired braking clearance between the friction members and the braking member. As illustrated the worm driving means comprises an adjuster shaft 17 journalled in the housing 1 for rotation in a bore 18 parallel to the axis of the worm wheel 2 but spaced radially therefrom in a direction away from the spindle 7. The adjuster shaft 17 is coupled to a member or bracket 19 which is stationary relative to the axis of the brake applying shaft by means of diametrical pin 20 and the pin 20 has an end portion 21 cranked to lie parallel to the axis of the spindle 7 and received in a notch in the bracket 19. As the lever 1 is moved angularly about the axis of the brake-applying shaft, the adjuster shaft 17 also rotates as it is moved with the lever 1. The adjuster shaft 17 is connected to the spindle 7 through a pawl 23 and a clutch assembly 24 located in the counterbore 12 and in a second counterbore 25 at that end of the housing 1.

The pawl 23 comprises a parallel sided elongate strip 26 which is guided for movement in a straight line between the sides of a parallel sided slot 27 which is tangential to the brake-applying shaft and normal to the spindle 7. The pawl 23 is cut back along one edge to define an abutment for one end of a compression return spring 28 which urges the pawl at all times into engagement with a cam formation 29 on the adjuster shaft 17.

The clutch assembly 24 comprises inner and outer rotatable clutch members 50 and 51 of which the inner member 50 is rotatable on a friction ring 52 in the counterbore 12 and is coupled to the spindle 7 through a one-way drive 34. The inner member 50 is of cup-shaped outline and is also rotatably mounted on a reduced diameter portion 53 at that end of the spindle 7. The member 50 has an inclined external clutch face 55 which is urged by means of a spring washer 56 into engagement with a complementary internal clutch face 57 on the outer clutch member 51 which, in turn, is rotatable in the counterbore 25. The outer clutch member 51 is provided in its outer emd with a pair of angularly spaced axial slots 58 and 59 between which is defined a tooth 60, and the tooth 60 is received in a notch 43 at the inner end of the pawl 23. In a normal inoperative position the tooth 60 is in engagement with a face 41 at the outer end of the notch 43 and the tooth 40 is spaced from a face 42 at the inner end of the notch 43 by a distance corresponding to a predetermined clearance between the friction members and the braking member.

The clutch assembly 24 serves two purposes. The first is to protect the one-way drive 34 by limiting the torque that the drive is required to transmit. This limiting torque is determined by the force exerted by the spring washer 56. The second purpose is to stop adjustment taking place after the braking clearances have been taken up. The torque that can be transmitted by the clutch assembly 24 is limited as described above, hence the one-way drive 34 can only rotate the spindle 7 against a limiting reaction torque. Beyond such torque the clutch assembly will slip, with the outer member 51 rotating relative to the inner member 50 which remain rotationally stationary relative to the housing 1. The aforementioned limited reaction torque is derived from the reaction torque in the brake applying shaft and the worm wheel 2 and through the engagement forces between the worm wheel 2 and the worm 6.

In operation, angular movement of the housing 1 in a clockwise brake-applying direction with reference to FIG. 1, rotates the brake-applying shaft through the worm 6 and the worm wheel 2, characteristically a one-way drive, until the braking clearances have been taken up. During this movement the adjuster shaft 17 is also rotated to cause the pawl 26 to slide linearly in the slot 27 against the force in the spring 28 with the face 41 moving away from the teeth 42 and the face 42 moving towards them to reduce the lost-motion clearance therebetween. Normally the face 42 will not contact the tooth 60 unless adjustment is required to compensate for wear of the friction members.

When the angular movement of the lever 1 is transmitted through the worm 6 and worm-wheel 2 to the brake applying shaft to apply the brake and further rotate the adjuster shaft 17, the face 42 of the pawl 23 rotates the outer clutch member 51 through the tooth 60. Once the aforementioned braking clearances have been taken up the engagement forces between the worm 6 and the worm wheel 2 are of such a magnitude that the aforementioned limiting clutch torque is insufficient to rotate the worm 6. The clutch assembly 24 then slips as described above and no adjustment takes place.

When wear of the friction members has occurred, during the initial angular movement to take up the braking clearances once the lost-motion has been taken up, the outer clutch member 51 is rotated by the pawl 26 and the inner clutch member 50 rotates with it due to the engagement of adjacent faces of the members. The inner clutch member 50 rotate the spindle 7 and hence the worm 6 through the one-way drive 34. The worm rotates the worm wheel 2 relative to the housing 1 and adjustment is achieved. When all the braking clearances have been taken up the clutch assembly 24 slips as described above without impeding movement of the pawl 23 or the adjuster shaft 17.

When the brake is released the stored energy in the spring 28 maintains the pawl 26 in engagement with the adjuster shaft 17 so that the outer clutch member 51 is returned to its initial position by the face 41 engaging with the tooth 60. Due to the provision of the one-way drive 34 the inner clutch member 50 also rotates with the outer clutch member 51, but with respect to the spindle 7.

Annular sealing rings 46 are located between the cover plates 4 and 5 and the worm wheel 2, and gaskets 47 are located between the housing 1 and the plates 4 and 5. Thus the unit is sealed completely against the ingress of dirt and other foreign matter.

I claim:

1. An automatic slack adjuster for a vehicle brake applying linkage of the type comprising a shaft mounted for rotation about its longitudinal axis for applying or releasing the brake, and a housing which constitutes a lever in the linkage and is mounted for rocking movement about said axis of said shaft and with respect to a relatively stationary part, wherein said adjuster comprises a worm wheel mounted on and secured against rotation relative to said shaft, a worm mounted in said housing and meshing with said worm wheel to transmit angular movement of said lever to said shaft, and automatic worm driving means for rotating said worm with respect to said housing to compensate for slack in said linkage in response to relative movement between said lever and said relatively stationary part, said automatic worm driving means incorporating a connection having a degree of lost-motion equivalent to a desired braking clearance, said connection including a clutch comprising first clutch means coupled to said worm, second clutch means, and resilient means for urging said second clutch means normally into driving engagement with said first clutch means, and a linearly slidable pawl acting between said second clutch means and said stationary part to effect rotation of said second clutch means after relative movement between said lever and said stationary part has exceeded a value equivalent to said degree of lost-motion, and wherein a spindle is provided with which said worm is fast, said connection having said degree of lost-motion is located between said pawl and said second clutch means so that rotation of said second clutch means occurs only upon direct engagement of said pawl with said second clutch means, and a one-way drive is disposed between said first clutch means and said spindle, a return spring provided for urging said pawl into an inoperative position deflecting to store energy therein as said pawl is moved linearly on each engular movement of said lever, release of said stored energy in a brake application after said lost-motion has been taken up and which is operative to return said pawl to said inoperative position also being operative to effect rotation of both clutch means with respect to said spindle and through said one-way drive to re-establish a desired degree of lost-motion.

2. An automatic slack adjuster as claimed in claim 1, wherein said first clutch means is provided with at least one tooth and said pawl is provided with a notch in which said tooth is received, said notch being of greater length than the circumferential length of said tooth to define said lost-motion.

3. An automatic slack adjuster for a vehicle brake applying linkage of the type comprising a shaft mounted for rotation about its longitudinal axis for applying or releasing the brake, and a housing which constitutes a lever in the linkage and is mounted for rocking movement about said axis of said shaft and with respect to a relatively stationary part, wherein said adjuster comprises a worm wheel mounted on and secured against rotation relative to said shaft, a worm mounted in said housing and meshing with said worm wheel to transmit angular movement of said lever to said shaft, and automatic worm driving means for rotating said worm with respect to said housing to compensate for slack in said linkage in response to relative movement between said lever and said relatively stationary part, said automatic worm driving means incorporating a connection having a degree of lost-motion equivalent to a desired braking clearance, said connection including a clutch comprising first clutch means coupled to said worm, second clutch means, and resilient means for urging said second clutch means normally into driving engagement with said first clutch means, and a linearly slidable pawl acting between said second clutch means and said stationary part to effect rotation to said second clutch means after relative movement between said lever and said stationary part has exceeded a value equivalent to said degree of lost-motion, and wherein said clutch is of the cone type comprising a single first and a second interengaging clutch members.

4. An automatic slack adjuster for a vehicle brake applying linkage of the type comprising a shaft mounted for rotation about its longitudinal axis for applying or releasing the brake, and a housing which constitutes a lever in the linkage and is mounted for rocking movement about said axis of said shaft and with respect to a relatively stationary part, wherein said adjuster comprises a worm wheel mounted on and secured against rotation relative to said shaft, a worm mounted in said housing and meshing with said worm wheel to transmit angular movement of said lever to said shaft, and automatic worm driving means for rotating said worm with respect to said housing to compensate for slack in said linkage in response to relative movement between said lever and said relatively stationary part, said automatic worm driving means incorporating a connection having a degree of lost-motion equivalent to a desired braking clearance, said connection including a clutch comprising first clutch means coupled to said worm, second clutch means, and resilient means for urging said second clutch means normally into driving engagement with said first clutch means, and a linearly slidable pawl acting between said second clutch means and said stationary part to effect rotation of said second clutch means after relative movement between said lever and said stationary part has exceeded a value equivalent to said degree of lost-motion, and wherein an adjusting shaft is eccentrically mounted with respect to said axis for rotation of said lever and is angularly movable through an arc of a circle centred on said stationary part with respect to which said lever is angularly movable, said pawl being positively urged linearly by means of an engagement with said adjusting shaft.

* * * * *